US012563642B2

(12) United States Patent
Su et al.

(10) Patent No.: US 12,563,642 B2
(45) Date of Patent: Feb. 24, 2026

(54) BASE STATION MANAGEMENT DEVICE AND METHOD

(71) Applicant: LITE-ON TECHNOLOGY CORPORATION, Taipei (TW)

(72) Inventors: Chih-Wei Su, Taipei (TW); Chen-chieh Tsai, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 416 days.

(21) Appl. No.: 18/182,656

(22) Filed: Mar. 13, 2023

(65) Prior Publication Data

US 2023/0217547 A1 Jul. 6, 2023

(30) Foreign Application Priority Data

Nov. 1, 2022 (TW) ................................. 111141577

(51) Int. Cl.
*H04W 88/12* (2009.01)
*H04W 92/12* (2009.01)

(52) U.S. Cl.
CPC ............ *H04W 88/12* (2013.01); *H04W 92/12* (2013.01)

(58) Field of Classification Search
CPC ...... H04W 88/12; H04W 92/12; H04W 92/14
See application file for complete search history.

(56) References Cited

U.S. PATENT DOCUMENTS

2021/0051490 A1 2/2021 Yanover et al.
2023/0110771 A1* 4/2023 Chung .................. H04W 28/02 370/329
2023/0126312 A1* 4/2023 Tsai ........................ H04L 67/60 709/217
2023/0209390 A1* 6/2023 Zeng ..................... H04W 24/02
2023/0217547 A1* 7/2023 Su ......................... H04W 88/12 370/329
2023/0388844 A1* 11/2023 Dent ................. H04W 28/0215
2024/0196178 A1* 6/2024 Ying ....................... H04W 8/18
(Continued)

FOREIGN PATENT DOCUMENTS

WO 2022/155511 A1 7/2022
WO WO-2024033545 A1 * 2/2024 ............ H04W 24/02

OTHER PUBLICATIONS

Chinese language office action dated Jun. 27, 2023, issued in application No. CN 111141577.

*Primary Examiner* — Asad M Nawaz
*Assistant Examiner* — Michael Wayne Maddox
(74) *Attorney, Agent, or Firm* — McClure, Qualey & Rodack, LLP

(57) ABSTRACT

A base station management device is provided in the invention. The base station management device includes a Non-Real Time (Non-RT) Radio-Access-Network Intelligent Controller (RIC) and a management device. The Non-RT RIC communicates with applications through a first communication interface. The management device manages a plurality of base stations, communicates with the Non-RT RIC through a second communication interface, and registers a first application and a second application through the Non-RT RIC. The management device detects the plurality of base stations through the first application to determine whether to update the parameter information of the plurality of base stations through the second application.

14 Claims, 7 Drawing Sheets

(56) References Cited

U.S. PATENT DOCUMENTS

| | | | | |
|---|---|---|---|---|
| 2024/0214272 | A1* | 6/2024 | Ying | H04L 41/0894 |
| 2024/0236691 | A1* | 7/2024 | Bonati | H04W 24/02 |
| 2024/0267870 | A1* | 8/2024 | Shete | H04W 60/04 |
| 2025/0133419 | A1* | 4/2025 | Shete | H04W 28/16 |

* cited by examiner

BASE STATION MANAGEMENT DEVICE AND METHOD

CROSS REFERENCE TO RELATED APPLICATIONS

This Application claims priority of TW Patent Application No. 111141577 filed on Nov. 1, 2022, the entirety of which is incorporated by reference herein.

BACKGROUND OF THE INVENTION

Field of the Invention

The invention generally relates to base station management technology, and more particularly, to base station management technology in which a base station management device is configured to manage and compensate a plurality of base stations.

Description of the Related Art

The 5G Open Radio Access Network (O-RAN) structure is a new network structure established by global telecommunication operators. In the open structure, a 5G mobile network may be constructed using hardware and software from many providers, for flexibility, open and to keep the cost low.

In the O-RAN structure, the Service Management and Orchestration (SMO) framework may comprise a Non-Real time (Non-RT) Radio-Access-Network Intelligent Controller (RIC). The applications (rAPPs) carried on the SMO framework may be a feature of the Non-RT RIC structure. These applications (rApps) may be used to optimize the base stations or provide other services to the SMO framework.

The applications (rApps) may register the service, subscribe to data, and provide a subscribed service at the Non-RT RIC through an R1 interface defined in the O-RAN standard. Then, the applications (rApps) may be used to adjust the parameters of base stations through the O1 interface of the SMO framework. Because the format of the R1 has been defined, the applications (rApps) developer may be able to realize the R1 interface through a different programming language to use the functions of other registered applications (rApps) to provide service to the SMO framework or other applications (rApps). Therefore, the development of applications (rApps) may be flexible and diverse.

BRIEF SUMMARY OF THE INVENTION

A base station management device and method are provided to overcome the problems mentioned above.

An embodiment of the invention provides a base station management device. The base station management device includes a Non-Real Time (Non-RT) Radio-Access-Network Intelligent Controller (RIC) and a management device. The Non-RT RIC communicates with applications through a first communication interface. The management device manages a plurality of base stations, communicates with the Non-RT RIC through a second communication interface, and registers a first application and a second application through the Non-RT RIC. The management device detects the base stations through the first application to determine whether to update parameter information of the base stations through the second application.

In an embodiment, the first communication interface and the second communication interface are R1 interfaces.

In an embodiment, the first application periodically obtains the current parameter information of the base stations through the Non-RT RIC based on a time interval and determines whether the status of the base stations has changed. When the status of the base stations has changed, the first application requests the Non-RT RIC to subscribe to the second application. The second application obtains the parameter information of the base stations from the Non-RT RIC and adjusts the parameter information of the base stations based on the coverage of the base stations. The second application provides the adjusted parameter information of the base stations to the first application and the first application provides the adjusted parameter information of the base stations to the management device to determine whether to update the database established by the first application.

An embodiment of the invention provides a base station management method. The base station management method is applied to a base station management device. The base station management method includes following steps. A management device of the base station management device registers first application and a second application through a Non-Real Time (Non-RT) Radio-Access-Network Intelligent Controller (RIC) of the base station management device, wherein the Non-RT RIC communicates with the first application and the second application through a first communication interface and the management device communicates with the Non-RT RIC through a second communication interface. The management device detects the base stations through the first application to determine whether to update parameter information of the base stations through the second application.

Other aspects and features of the invention will become apparent to those with ordinary skill in the art upon review of the following descriptions of specific embodiments of a base station management device and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
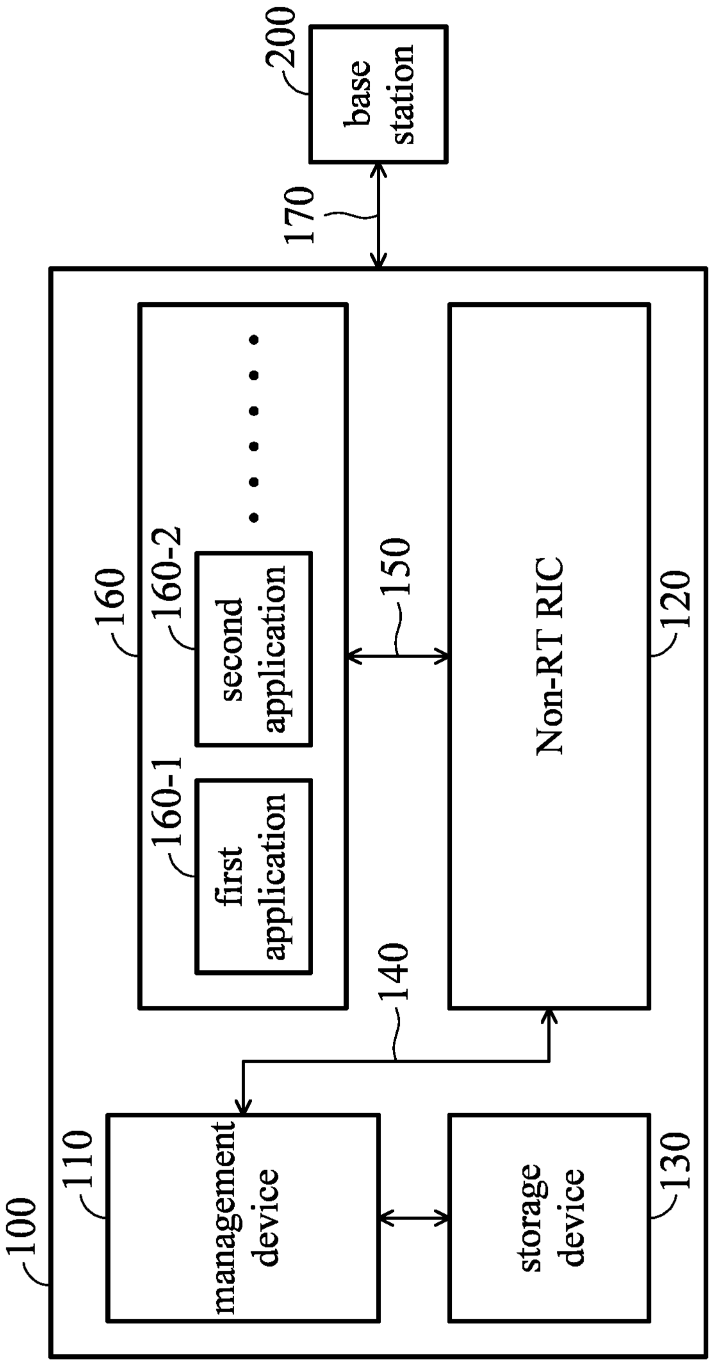
FIG. 1 is a block diagram of base station management device 100 according to an embodiment of the invention.

FIG. 1 is a block diagram of base station management device 100 according to an embodiment of the invention. The base station management device 100 may apply in an Open Radio Access Network (O-RAN) structure. As shown in FIG. 1, the base station management device 100 may comprise a management device 110, a Non-Real Time (Non-RT) Radio-Access-Network Intelligent Controller (RIC) 120 and a storage device 130. It should be noted that in order to clarify the concept of the invention, FIG. 1 presents a simplified block diagram in which only the elements relevant to the invention are shown. However, the invention should not be limited to what is shown in FIG. 1. The base station management device 100 may comprise other elements.

According to an embodiment of the invention, the management device 110 may be a radio access network (RAN) Element Management System (EMS). The Non-RT RIC 120 and the management device 110 may be comprised in a Service Management and Orchestration (SMO) framework (not shown in figures) of the O-RAN structure. The Non-RT RIC 120 and the management device 110 may communicate each other through a communication interface 140. According to an embodiment of the invention, the communication interface 140 may be an R1 interface of the O-RAN structure. The management device 110 and the Non-RT RIC may transmit the network packets based on Hyper Text Transfer Protocol (HTTP) through the R1 interface.

According to an embodiment of the invention, the applications (rAPPs) subscribed or carried in the SMO framework may comprise the Cell Outage Detection and Compensation (CODC) application provided in the invention (the CODC application is regarded as the first application in the invention). In addition, the applications (rAPPs) subscribed or carried in the SMO framework may also comprise Auto Neighbor Relation (ANR) application, Physical Cell Identifier (PCI) Automation application, and Coverage and Capacity Optimization (CCO) application, but the invention should not be limited thereto. In the embodiments of the invention, the applications (rAPPs) except for the CODC application may be regarded as a third party rAPP. According to an embodiment, the Non-RT RIC 120 may communication with the applications (rAPPs) 160 subscribed or carried in the SMO framework through a communication interface 150. According to an embodiment of the invention, the communication interface 150 may be an R1 interface of the O-RAN structure.

The storage device 130 may store the software and firmware program codes, system data, user data, etc. of the base station management device 100. The storage device 130 may be a volatile memory such as a Random Access Memory (RAM); a non-volatile memory such as a flash memory or Read-Only Memory (ROM); a hard disk; or any combination thereof.

According to an embodiment of the invention, the base station management device 100 may be used to manage a plurality of base stations (FIG. 1 only shows one base station 200, but the invention should not be limited thereto). As shown FIG. 1, the base station management device 100 may transmit data or information to a plurality of base stations 200 through communication interface 170 and receive data or information from the base stations 200 through a communication interface 170. In the embodiments of the invention, the communication interface 170 may be an O1 interface. According to an embodiment of the invention, a plurality of base stations may be Generation Node Bs (gNBs).

According to an embodiment of the invention, the management device 110 may register and subscribe to the first application (rAPP) 160-1 to detect and optimize the base stations 200 managed by the base station management device 100. Details may be illustrated below by FIG. 2.

Figure 2:
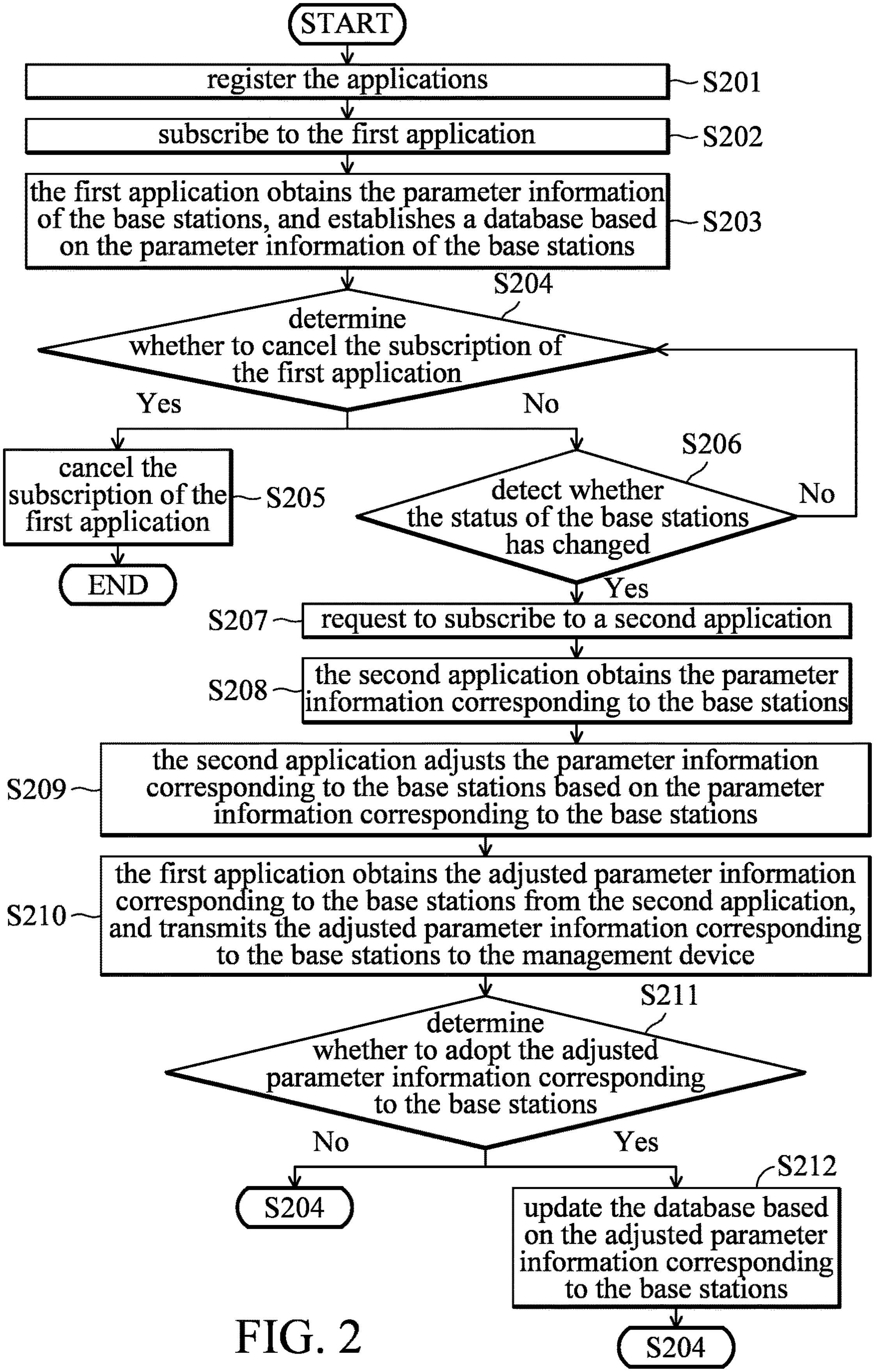
FIG. 2 is a flow chart of base station management method according to an embodiment of the invention.

FIG. 2 is a flow chart of base station management method according to an embodiment of the invention. The flow of FIG. 2 may be applied in base station management device 100. As shown in FIG. 2, in step S201, the management device 110 of the base station management device 100 may register the applications (rAPPs) 160 subscribed or carried in the SMO framework through the Non-RT RIC 120 of the base station management device 100. Details about registering the applications (rAPPs) are illustrated below by FIG. 3.

Figure 3:
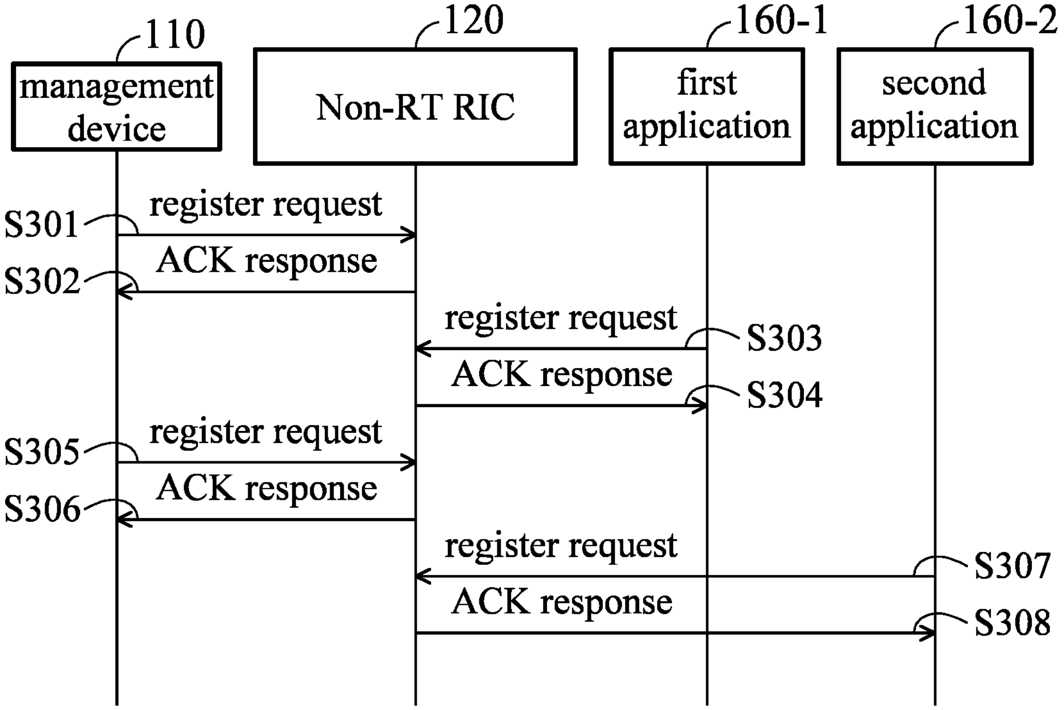
FIG. 3 is a flow chart of registering the applications according to an embodiment of the invention.

FIG. 3 is a flow chart of registering the applications according to an embodiment of the invention. As shown in FIG. 3, it is assumed that the management device 110 may register the first application 160-1 (i.e., CODC application) and the second application (i.e., CCO application) through the Non-RT RIC 120. In step S301, the management device 110 may transmit a register request (e.g., transmit a pre-defined Uniform Resource Identifier (URI): PUT/data-producer/v1/info-types/codc_input) to the Non-RT RIC 120 to request the Non-RT RIC 120 to register the first application 160-1. In step S302, the Non-RT RIC 120 may transmit an Acknowledgement (ACK) response (e.g., transmit a pre-defined URI: 200 OK) to the management device 110. In step S303, the first application 160-1 may transmit a register request (e.g., transmit a pre-defined Uniform Resource Identifier (URI): PUT/data-producer/v1/info-types/codc) to the Non-RT RIC 120. In step S304, the Non-RT RIC 120 may transmit an Acknowledgement (ACK) response (e.g., transmit a pre-defined URI: 200 OK) to the first application 160-1 to complete the register of the first application 160-1. Accordingly, in step S305, the management device 110 may transmit a register request (e.g., transmit a pre-defined Uniform Resource Identifier (URI): PUT/data-producer/v1/info-types/cco_input) to the Non-RT RIC 120 to request the Non-RT RIC 120 to register the second application 160-2. In step S306, the Non-RT RIC 120 may transmit an Acknowledgement (ACK) response (e.g., transmit a pre-defined URI: 200 OK) to the management device 110. In step S307, the second application 160-2 may transmit a register request (e.g., transmit a pre-defined Uniform Resource Identifier (URI): PUT/data-producer/v1/info-types/cco) to the Non-RT RIC 120. In step S308, the Non-RT RIC 120 may transmit an Acknowledgement (ACK) response (e.g., transmit a pre-defined URI: 200 OK) to the second application 160-2 to complete the register of the second application 160-2. It should be noted that the URIs illustrated in the embodiments are only taken as examples, but the invention should not be limited thereto. The URIs illustrated in the embodiments may be adjusted appropriately based on the network data packet format of the R1 interface transmission defined in the O-RAN standard.

Back to FIG. 2, in step S202, the management device 110 may subscribe to the first application 160-1 (i.e., the CODC application) through the Non-RT RIC 120 of the base station management device 100.

In step S203, the first application 160-1 may obtain the parameter information of the base stations managed by the base station management device 100 from the management device 110 through the Non-RT RIC 120, and establish a database based on the parameter information of the base stations. According to an embodiment of the invention, the parameter information of the base stations may comprise identification (ID) of each base station, a time interval and the field information (e.g., the ID of the field) currently corresponding to the base station, but the invention should not be limited thereto. After the database has been established, the first application 160-1 may provide its corresponding service periodically every time interval.

Details about subscribing the applications (rAPPs) in steps S202 and S203 are illustrated below by FIG. 4.

Figure 4:
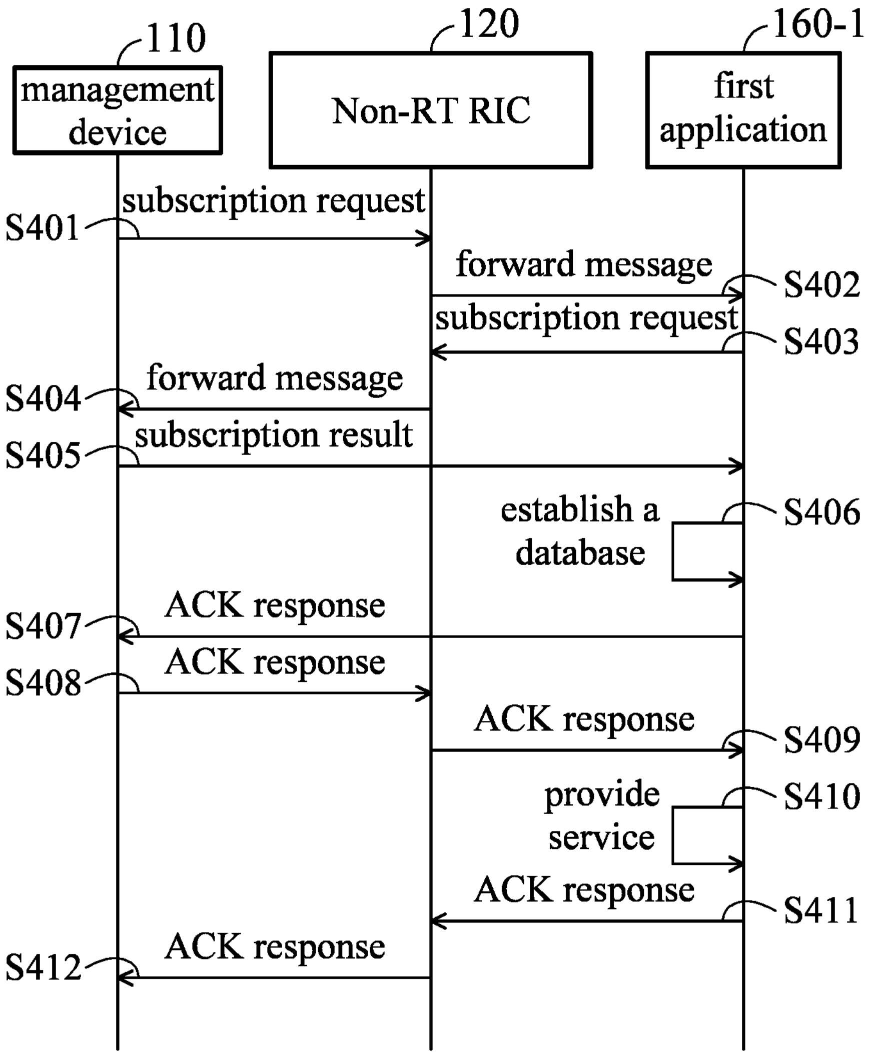
FIG. 4 is a flow chart of subscribing the applications according to an embodiment of the invention.

FIG. 4 is a flow chart of subscribing the applications according to an embodiment of the invention. As shown in FIG. 4, it is assumed that the management device 110 may subscribe to the first application 160-1 (i.e., CODC application) through the Non-RT RIC 120 of the base station management device 100. In step S401, the management device 110 may transmit a subscription request (e.g., transmit a pre-defined URI: PUT/data-consumer/v1/info-jobs/codc) to the Non-RT RIC 120. The subscription request transmitted by the management device 110 may comprise the parameter information of the base stations managed by the base station management device 100, e.g., {field: 13$^{th}$ floor of building, time interval: T}, but the invention should not be limited thereto. In step S402, the Non-RT RIC 120 may transmit a forward message (e.g., transmit a pre-defined URI: POST/data-producer/info-jobs) to the first application 160-1 based on the subscription request of the management device 110. In step S403, the first application 160-1 may transmit a subscription request (e.g., transmit a pre-defined URI: PUT/data-consumer/v1/info-jobs/codc_input) to the Non-RT RIC 120 based on the forward message of the Non-RT RIC 120. The subscription request transmitted by the first application 160-1 may comprise the obtained field information corresponding to the base stations. In step S404, the Non-RT RIC 120 may transmit a forward message (e.g., transmit a pre-defined URI: POST/data-producer/info-jobs) to the management device 110 based on the subscription request of the first application 160-1. In step S405, when the management device 110 determines that the field information corresponding to the base stations obtained by the first application 160-1 is the same as the field information corresponding to the base stations obtained by the management device 110, the management device 110 may transmit a subscription result (e.g., transmit a pre-defined URI: POST/job_result/codc_input) to the first application 160-1. The subscription result transmitted by the management device 110 may comprise the current parameter information corresponding to the base stations. It should be noted that the management device 110 and the first application 160-1 have registered at the Non-RT RIC 120, and therefore, after the management device 110 and the first application 160-1 have completed the subscription operations, it is regarded as that the Non-RT RIC 120, the management device 110 and the first application 160-1 have the capability of directly transmitting the subscription result and the Acknowledgement (ACK) response for the subscription result each other. Therefore, step S405 shows that the management device 110 may directly transmit the subscription result to the first application 160-1, and similar steps in figures will be presented in the same way below. In step S406, the first application 160-1 may establish a database based on the obtained parameter information corresponding to the base stations. In step S407, the first application 160-1 may transmit an Acknowledgement (ACK) response (e.g., transmit a pre-defined URI: 200 OK) to the management device 110. In step S408, the management device 110 may transmit an Acknowledgement (ACK) response (e.g., transmit a pre-defined URI: 200 OK) to the Non-RT RIC 120. In step S409, the Non-RT RIC 120 may transmit an Acknowledgement (ACK) response (e.g., transmit a pre-defined URI: 200 OK) to the first application 160-1. In step S410, the first application 160-1 may establish threads to periodically provide its service based on the parameter information (corresponding to the base stations) obtained at each time interval. In step S411, the first application 160-1 may transmit an Acknowledgement (ACK) response (e.g., transmit a pre-defined URI: 200 OK) to the Non-RT RIC 120. In step S412, the Non-RT RIC 120 may transmit an Acknowledgement (ACK) response (e.g., transmit a pre-defined URI: 200 OK) to the management device 110. It should be noted that the URIs illustrated in the embodiments are only taken as examples, but the invention should not be limited thereto. The URIs illustrated in the embodiments may be adjusted appropriately based on the network data packet format of the R1 interface transmission defined in the O-RAN standard.

Back to FIG. 2, in step S204, at each time interval, the first application 160-1 may determine whether the management device 110 transmitting a request to cancel the subscription of the first application 160-1. If the management device 110 transmits the request to cancel the subscription of the first application 160-1, step S205 is performed. In step S205, the first application 160-1 may delete the established database to cancel the subscription of the first application 160-1.

Details about canceling subscription in steps S204 and S205 are illustrated below by FIG. 5.

Figure 5:
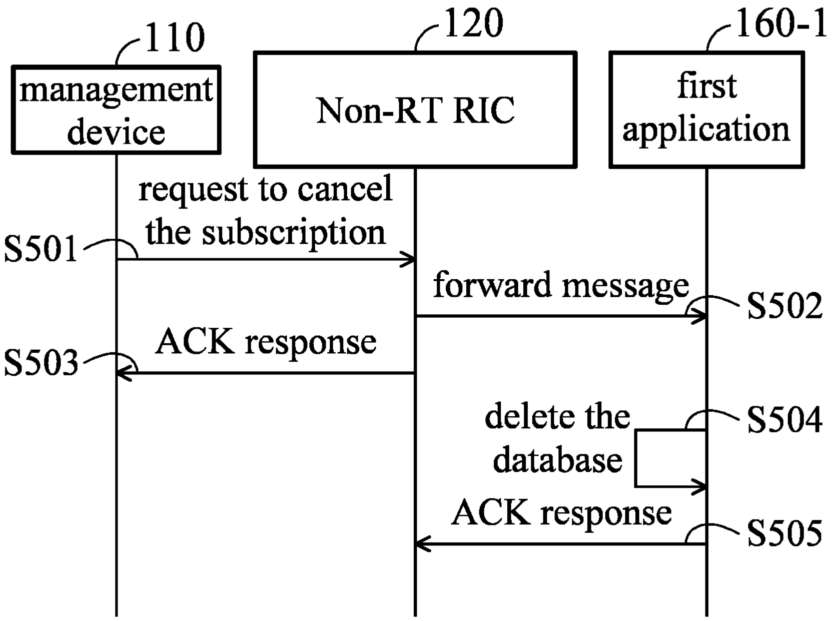
FIG. 5 is a flow chart of canceling the subscription according to an embodiment of the invention.

FIG. 5 is a flow chart of canceling the subscription according to an embodiment of the invention. As shown in FIG. 5, it is assumed that the management device 110 may cancel the subscription of the first application 160-1 (i.e., CODC application) through the Non-RT RIC 120 of the base station management device 100. In step S501, the management device 110 may transmit a request to the Non-RT RIC 120 to cancel the subscription (e.g., transmit a pre-defined URI: DELET/data-consumer/v1/info-jobs/codc). In step S502, the Non-RT RIC 120 may transmit a forward message (e.g., transmit a pre-defined URI: DELET/data-producer/info-jobs/codc) to the first application 160-1 based on the request canceling subscription transmitted by the management device 110. In step S503, the Non-RT RIC 120 may transmit an Acknowledgement (ACK) response (e.g., transmit a pre-defined URI: 200 OK) to the management device 110. In step S504, after the first application 160-1 receives the forward message transmitted by the Non-RT RIC 120, the first application 160-1 may delete the established database. In step S505, the first application 160-1 transmit an Acknowledgement (ACK) response (e.g., transmit a predefined URI: 200 OK) to the Non-RT RIC 120. It should be noted that the URIs illustrated in the embodiments are only taken as examples, but the invention should not be limited thereto. The URIs illustrated in the embodiments may be adjusted appropriately based on the network data packet format of the R1 interface transmission defined in the O-RAN standard.

Back to FIG. 2, if the management device 110 does not transmit the request to cancel the subscription of the first application 160-1, step S206 is performed. In step S206, the management device 110 may use the first application 160-1 to detect whether the status of the base stations has changed. Specifically, the first application 160-1 may request the current parameter information corresponding to the base stations from the management device 110, and then the first application 160-1 may compare the current parameter information to the parameter information obtained at prior time interval to determine whether the status of the base stations has changed. If the status of the base stations has not changed (e.g., all of the base stations in the field operate normally and no faults occur), the method may return to step S204 for the next determination at the next time interval.

Details about detecting whether the status of the base stations has changed in step S206 are illustrated below by FIG. 6.

Figure 6:
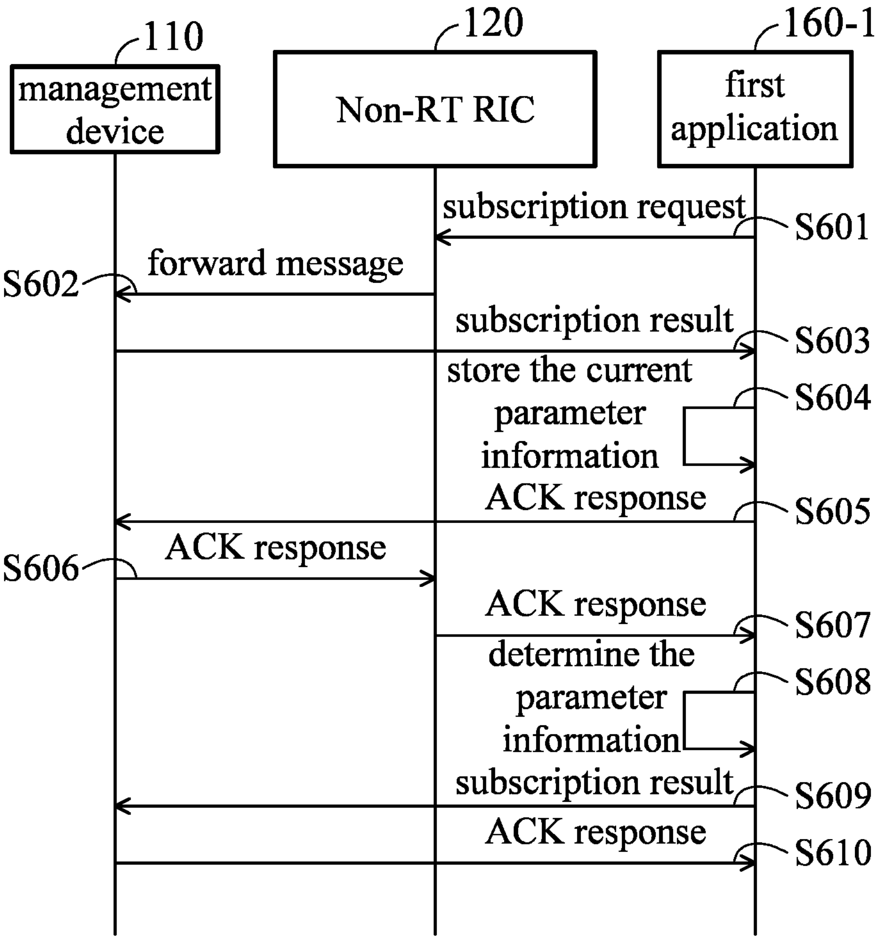
FIG. 6 is a flow chart of detecting whether the status of the base stations has changed according to an embodiment of the invention.

FIG. 6 is a flow chart of detecting whether the status of the base stations has changed according to an embodiment of the invention. As shown in FIG. 6, in step S601, the first application 160-1 may transmit a subscription request (e.g., transmit a pre-defined URI: PUT/data-consumer/v1/info-types/codc_input) to the Non-RT RIC 120 to request the current parameter information of the base stations. The subscription request transmitted by the first application 160-1 may comprise the field information of the base station. In step S602, the Non-RT RIC 120 may transmit a forward message (e.g., transmit a pre-defined URI: POST/data-producer/info-job) to the management device 110 based on the subscription request from the first application 160-1. In step S603, when management device 110 determines that the field information corresponding to the base stations obtained by the first application 160-1 is the same as the field information corresponding to the base stations obtained by the management device 110, the management device 110 may transmit a subscription result (e.g., transmit a pre-defined URI: POST/job_result/codc_input) to the first application 160-1. The subscription result transmitted by the management device 110 may comprise the current parameter information corresponding to the base stations. In step S604, the first application 160-1 may store the current parameter information corresponding to the base stations in the database. In step S605, the first application 160-1 may transmit an Acknowledgement (ACK) response (e.g., transmit a pre-defined URI: 200 OK) to the management device 110. In step S606, the management device 110 may transmit an Acknowledgement (ACK) response (e.g., transmit a pre-defined URI: 200 OK) to the Non-RT RIC 120. In step S607, the Non-RT RIC 120 may transmit an Acknowledgement (ACK) response (e.g., transmit a pre-defined URI: 200 OK) to the first application 160-1. In step S608, the first application 160-1 may compare the current parameter information to the parameter information obtained at prior time interval to determine whether the status of the base stations has changed. If the status of the base stations has not changed (e.g., all of the base stations in the current field operate normally and no faults occur), step S609 is performed. In step S609, the first application 160-1 may transmit a subscription result (e.g., transmit a pre-defined URI: POST/job_result/codc) to the management device 110 to tell the management device 110 that the status of the base stations do not change. In step S610, the management device 110 may transmit an Acknowledgement (ACK) response (e.g., transmit a pre-defined URI: 200 OK) to the first application 160-1. It should be noted that the URIs illustrated in the embodiments are only taken as examples, but the invention should not be limited thereto. The URIs illustrated in the embodiments may be adjusted appropriately based on the network data packet format of the R1 interface transmission defined in the O-RAN standard.

Back to FIG. 2, if the status of the base stations has changed (e.g., failure of one or more base stations occurs in the field), step S5207 is performed. In step S207, the first application 160-1 may request the Non-RT RIC 120 to subscribe to a second application 160-2 (i.e., CCO application) for compensation operations.

In step S208, the second application 160-2 may obtain the parameter information corresponding to the base stations from the management device 110.

In step S209, the second application 160-2 may adjust the parameter information corresponding to the base stations based on the parameter information corresponding to the base stations obtained from the management device 110. Specifically, the second application 160-2 may know the coverage of the base stations in the current field based on the parameter information corresponding to the base stations obtained from the management device 110. Then, the second application 160-2 may adjust the parameter information corresponding to the base stations based on the coverage of the base stations in the current field. For example, if failure or abnormality of a base station in the field occurs (i.e., the coverage of the base stations in the field is dropped), the second application 160-2 may adjust the transmission power parameters of the base stations. Then, the management device 110 may increase the transmission power of other base stations based on the adjusted parameter information corresponding to the base stations to maintain the normal coverage of the base stations in the field. For another example, if the loading of a base station in the field is too high, (i.e., too may user equipment (UE) (e.g., cell phones) use the base station) the second application 160-2 may adjust the transmission power parameters of the base stations. Then, the management device 110 may increase the transmission power of other base stations based on the adjusted parameter information corresponding to the base stations to make some UE transferred from the base station with high loading to other base station in the field to main the loading balance in the field.

In step S210, the first application 160-1 may obtain the adjusted parameter information corresponding to the base stations from the second application 160-2, and transmit the adjusted parameter information corresponding to the base stations to the management device 110.

In step S211, the management device 110 may determine whether to adopt the adjusted parameter information corresponding to the base stations.

If the management device 110 determines to adopt the adjusted parameter information corresponding to the base stations, step S212 is performed. In step S212, the first application 160-1 may update the database based on the adjusted parameter information corresponding to the base stations. In addition, the management device 110 may adjust the settings of the stations in the field based on the adjusted parameter information corresponding to the base stations.

If the management device 110 determines not to adopt the adjusted parameter information corresponding to the base stations, the method may return to step S204 to await the determination at next time interval.

Details about adjusting the parameter information of the base stations in steps S207-S212 are illustrated below by FIG. 7.

Figure 7:
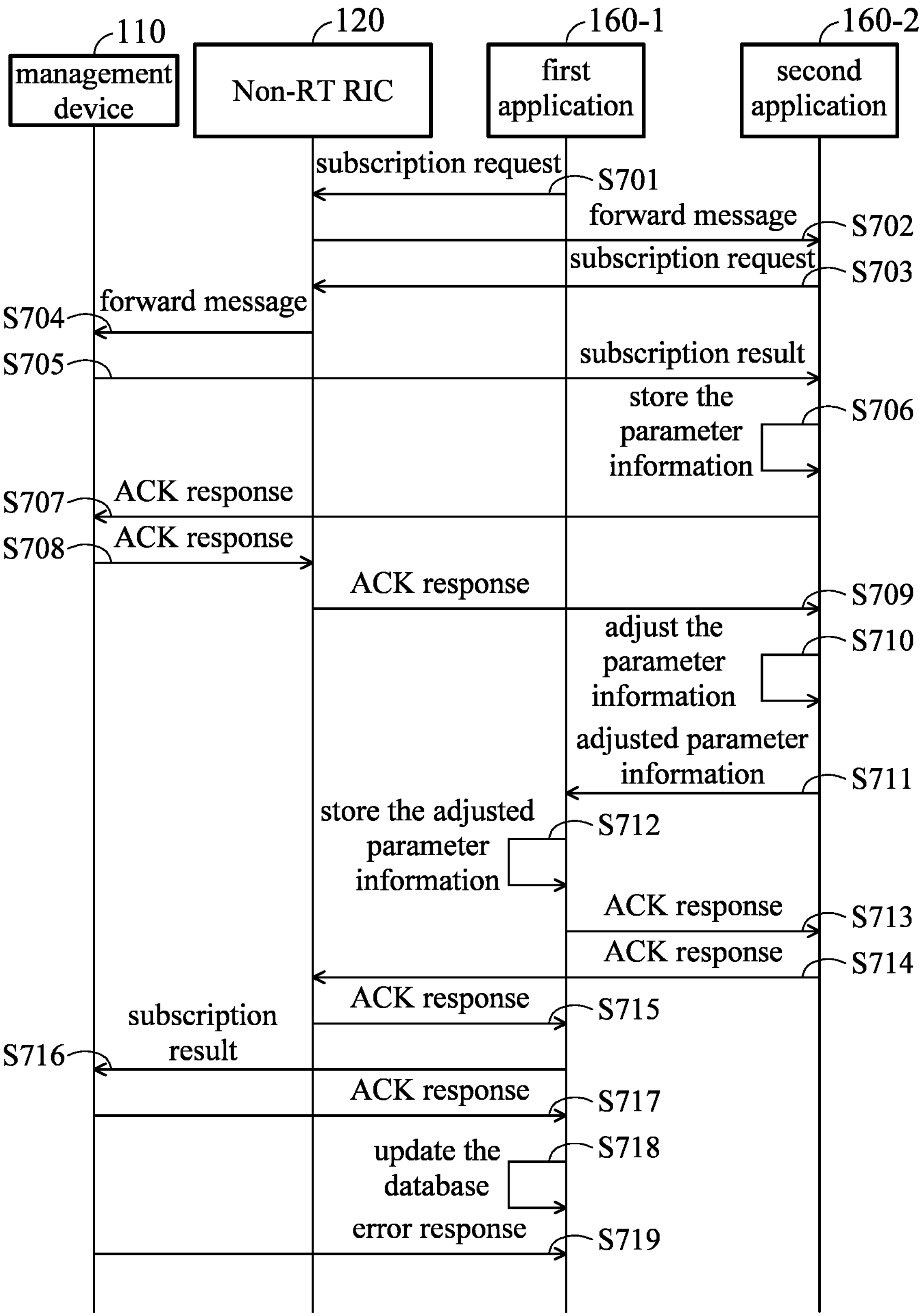
FIG. 7 is a flow chart of adjusting the parameter information of the base stations according to an embodiment of the invention.

FIG. 7 is a flow chart of adjusting the parameter information of the base stations according to an embodiment of the invention. As shown in FIG. 7, in step S701, after the first application 160-1 detects that the status of the base stations change, the first application 160-1 may transmit a subscription request (e.g., transmit a pre-defined URI: PUT/data-consumer/v1/info-jobs/cco) to the Non-RT RIC 120 to request the Non-RT RIC 120 to subscribe to the second application 160-2. The subscription request transmitted by the first application 160-1 may comprise the field information of the base stations. In step S702, the Non-RT RIC 120 may transmit a forward message (e.g., transmit a pre-defined URI: POST/data-producer/info-jobs) to the second application 160-2 based on the subscription request from the first application 160-1. In step S703, the second application 160-2 may transmit a subscription request (e.g., transmit a pre-defined URI: PUT/data-consumer/v1/info-jobs/cco_input) to the Non-RT RIC 120 to request the Non-RT RIC 120 to provide the current parameter information of the base stations. The subscription request transmitted by the second application 160-2 may comprise the field information of the base stations. In step S704, the Non-RT RIC 120 may transmit a forward message (e.g., transmit a pre-defined URI: POST/data-producer/info-jobs) to the management device 110 based on the subscription request from the second application 160-2. In step S705, when the management device 110 determines that the field information of the base stations obtained by the second application 160-2 are the same as the field information of the base stations obtained by the management device 110, the management device 110 may transmit a subscription result (e.g., transmit a pre-defined URI: POST/job_result/cco_input) to the second application 160-2. The subscription result transmitted by the management device 110 may comprise the current parameter information corresponding to the base stations. In step S706, the second application 160-2 may store the obtained parameter information of the base stations. In step S707, the second application 160-2 may transmit an Acknowledgement (ACK) response (e.g., transmit a pre-defined URI: 200 OK) to the management device 110. In step S708, the management device 110 may transmit an Acknowledgement (ACK) response (e.g., transmit a pre-defined URI: 200 OK) to the Non-RT RIC 120. In step S709, the Non-RT RIC 120 may transmit an Acknowledgement (ACK) response (e.g., transmit a pre-defined URI: 200 OK) to the second application 160-2. In step S710, the second application 160-2 may adjust the parameter information of the base stations based on the obtained parameter information of the base stations. In step S711, the second application 160-2 may provide the adjusted parameter information of the base stations to the first application 160-1. In step S712, the first application 160-1 may store the adjusted parameter information of the base stations from the second application 160-2. In step S713, the first application 160-1 may transmit an Acknowledgement (ACK) response (e.g., transmit a pre-defined URI: 200 OK) to the second application 160-2. In step S714, the second application 160-2 may transmit an Acknowledgement (ACK) response (e.g., transmit a pre-defined URI: 200 OK) to the Non-RT RIC 120. In step S715, the Non-RT RIC 120 may transmit an Acknowledgement (ACK) response (e.g., transmit a pre-defined URI: 200 OK) to the first application 160-1.

In step S5716, the first application 160-1 may transmit a subscription result (e.g., transmit a pre-defined URI: POST/job_result/codc) to the management device 110. The subscription result transmitted by the first application 160-1 may comprise the adjusted parameter information of the base stations from the second application 160-2. If the management device 110 determines to adopt the adjusted parameter information corresponding to the base stations, step S717 and step S718 are performed. In step S717, the management device 110 may transmit an Acknowledgement (ACK) response (e.g., transmit a pre-defined URI: 200 OK) to the first application 160-1. In step S718, the first application 160-1 may update the database based on the adjusted parameter information corresponding to the base stations. If the management device 110 determines not to adopt the adjusted parameter information corresponding to the base stations, step S719 is performed. In step S719, the management device 110 may transmit an error response (e.g., transmit a pre-defined URI: 400 error) to the first application 160-1 to tell the first application 160-1 that the first application 160-1 does not need to update the database based on the adjusted parameter information corresponding to the base stations.

According to the base station management method provided in the invention, the base station management device may adjust the parameter information of the base stations flexibly to maintain the coverage and loading of the base stations in the field. In addition, according to the base station management method provided in the invention, when a third party application (rAPP) has been subscribed, the third party application (rAPP) will be used to adjust the parameter information of the base stations dynamically without subscribing the third party application (rAPP) for each adjustment.

Use of ordinal terms such as “first”, “second”, “third”, etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a “processor”) such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A base station management device, comprising:

a Non-Real Time (Non-RT) Radio-Access-Network Intelligent Controller (RIC), communicating with applications through a first communication interface; and a management device, managing a plurality of base stations, communicating with the Non-RT RIC through a second communication interface, and registering a first application and a second application through the Non-RT RIC;

wherein the management device detects the plurality of base stations through the first application to determine whether to update parameter information of the plurality of base stations through the second application, wherein the parameter information comprises a time interval and field information of the plurality of base stations;

wherein the first application periodically obtains the parameter information of the plurality of base stations through the Non-RT RIC based on the time interval and determines whether a status of the plurality of base stations has changed; and wherein when the status of the plurality of base stations has changed, the first application requests the Non-RT RIC to subscribe to the second application.

2. The base station management device of claim 1, wherein the first communication interface and the second communication interface are RI interfaces.

3. The base station management device of claim 1, wherein the management device subscribes to the first application through the Non-RT RIC, and after the management device subscribes to the first application through the Non-RT RIC, the management device provide the parameter information of the plurality of base stations to the first application through the Non-RT RIC.

4. The base station management device of claim 3, wherein the first application establishes a database based on the parameter information of the plurality of base stations.

5. The base station management device of claim 1, wherein the second application obtains the parameter information of the plurality of base stations from the Non-RT RIC and adjusts the parameter information of the plurality of base stations based on a coverage of the plurality of base stations.

6. The base station management device of claim 5, wherein the second application provides the adjusted parameter information of the plurality of base stations to the first application and the first application provides the adjusted parameter information of the plurality of base stations to the management device to determine whether to update a database established by the first application.

7. The base station management device of claim 1, wherein the management device transmits a request to cancel a subscription to the Non-RT RIC to indicate the Non-RT RIC to delete the subscription of the first application.

8. A base station management method, applied to a base station management device, comprising:

registering, by a management device of the base station management device, a first application and a second application through a Non-Real Time (Non-RT) Radio-Access-Network Intelligent Controller (RIC) of the base station management device, wherein the Non-RT RIC communicates with the first application and the second application through a first communication interface, and the management device communicates with the Non-RT RIC through a second communication interface; and detecting, by the management device, the plurality of base stations through the first application to determine whether to update parameter information of the plurality of base stations through the second application, wherein the parameter information comprises a time interval and field information of the plurality of base stations; and wherein the method further comprises:

periodically obtaining, by the first application, the parameter information of the plurality of base stations through the Non-RT RIC based on the time interval;

determining whether a status of the plurality of base stations has changed; and when the status of the plurality of base stations has changed, requesting, by the first application, the Non-RT RIC subscribe to the second application.

9. The base station management method of claim 8, wherein the first communication interface and the second communication interface are RI interfaces.

10. The base station management method of claim 8, further comprising:

subscribing, by the management device, the first application through the Non-RT RIC; and providing, by the management device, the parameter information of the plurality of base stations to the first application through the Non-RT RIC.

11. The base station management method of claim 10, further comprising:

establishing, by the first application, a database based on the parameter information of the plurality of base stations.

12. The base station management method of claim 8, further comprising:

obtaining, by the second application, the parameter information of the plurality of base stations from the Non-RT RIC; and adjusting the parameter information of the plurality of base stations based on a coverage of the plurality of base stations.

13. The base station management method of claim 12, further comprising:

providing, by the second application, the adjusted parameter information of the plurality of base stations to the first application; and providing, by the first application, the adjusted parameter information of the plurality of base stations to the management device to determine whether to update a database established by the first application.

14. The base station management method of claim 8, further comprising:

transmitting, by the management device, a request of canceling a subscription to the Non-RT RIC to indicate the Non-RT RIC to delete the subscription of the first application.

* * * * *